United States Patent [19]

Zeiger

[11] Patent Number: 4,643,665
[45] Date of Patent: Feb. 17, 1987

[54] CHECK VALVE ASSEMBLY FOR INJECTION MOLDING MACHINE

[75] Inventor: Donald J. Zeiger, Malvern, Ohio

[73] Assignee: Mallard Machine Company, Canton, Ohio

[21] Appl. No.: 772,925

[22] Filed: Sep. 5, 1985

[51] Int. Cl.$^4$ .................................................. B29C 47/60
[52] U.S. Cl. .................................. 425/563; 425/564; 425/DIG. 224; 366/77
[58] Field of Search .............. 425/146, 190, 207, 562, 425/563, 564, 577, 587, DIG. 224, DIG. 225, 376 A; 264/40.7, 328.1; 366/77, 79

[56] References Cited

U.S. PATENT DOCUMENTS

| | | | |
|---|---|---|---|
| 2,940,123 | 6/1960 | Beck et al. | 425/564 |
| 3,007,202 | 11/1961 | Wucher | 425/562 |
| 3,319,299 | 5/1967 | Kiraly | 366/77 |
| 3,335,461 | 8/1967 | Schwartz | 425/562 |
| 3,590,439 | 7/1971 | Swanson | 425/564 |
| 4,062,479 | 12/1977 | Szabo | 425/564 |
| 4,105,147 | 8/1978 | Stubbe | 425/562 |
| 4,349,044 | 9/1982 | Schirmer | 425/562 |
| 4,394,117 | 7/1983 | Taylor | 425/563 |

FOREIGN PATENT DOCUMENTS 2108423 5/1983 United Kingdom ................ 425/207

OTHER PUBLICATIONS

Mallard Machine Company, advertising brochure entitled Adaptability with Respect to the Mallard Non-Return Ring Valve.

Primary Examiner—Jay H. Woo
Assistant Examiner—Timothy W. Heitbrink
Attorney, Agent, or Firm—Sand & Hudak Co.

[57] ABSTRACT

An improved check valve assembly which is mounted on the front end of a feedscrew of an injection molding machine having a check ring which is slidably mounted on the shank of a retainer within the heated barrel of the molding machine. An annular-shaped flow gap is formed between the inner periphery of the check ring and retainer shank for feeding cylindrical-shaped sleeves of heated material into a discharge chamber at the forward end of the barrel. The check ring is movable between a forward material feed position where it is engaged with a front valve seat and a rearward material blocking position where it is engaged with a rear valve seat. An annular groove concentric with the annular-shaped material flow gap is formed in the front face of the front valve seat and has an average depth at least equal to the thickness of the sleeve of material moving through the flow gap to permit the sleeve of material to flow unrestricted from the gap and past the front valve seat and into a plurality of flutes for discharge into the discharge chamber.

14 Claims, 8 Drawing Figures

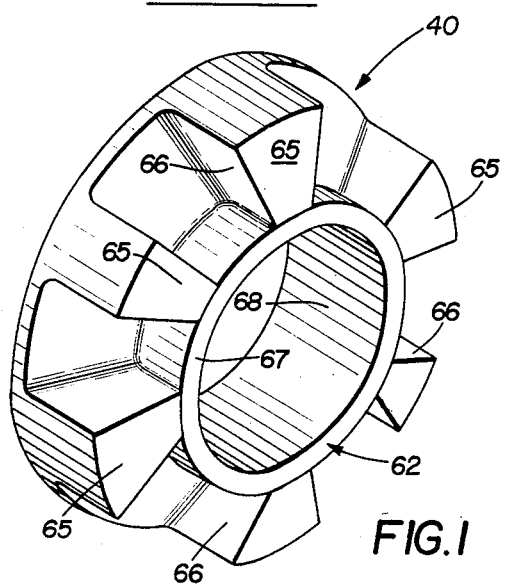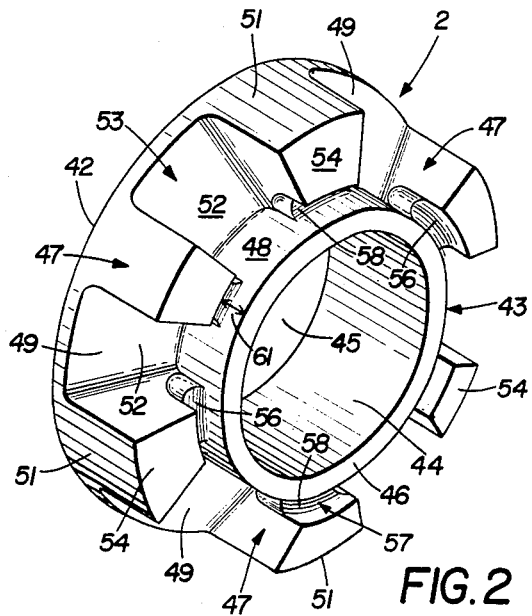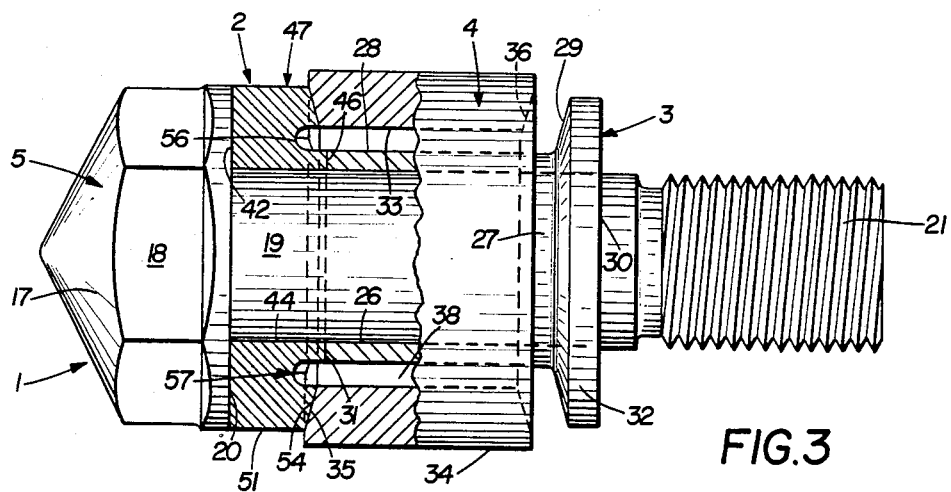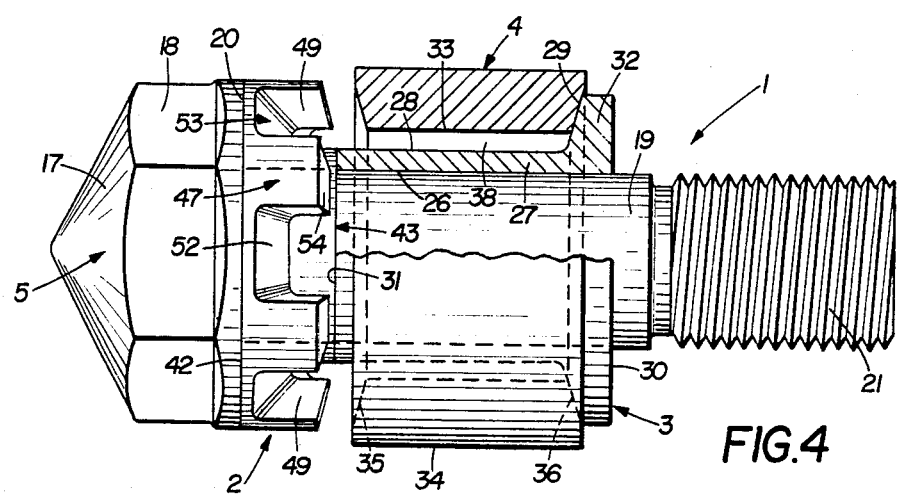

U.S. Patent  Feb. 17, 1987  Sheet 2 of 2  4,643,665 though the front seat and into the distribution chamber.

CHECK VALVE ASSEMBLY FOR INJECTION MOLDING MACHINE

TECHNICAL FIELD

The invention relates to injection molding machines and in particular to a check valve assembly which controls the flow of heated plastic material into a mold cavity. More specifically, the invention relates to an improved check valve assembly which enables a sleeve of material to flow unrestricted through the front seat from a heated barrel into a discharge chamber for subsequent injection into the mold cavity.

BACKGROUND ART

Injection molding machines of the type in which the invention pertains generally comprise an elongated feedscrew which rotates and reciprocates axially in the cylindrical bore of an elongated heated barrel for moving heated plastic material from an inlet end to the outlet end where it is injected from a distribution chamber through a nozzle and into a mold cavity. The flow of the heated plastic into the distribution chamber for subsequent discharge through the nozzle is controlled by a check valve assembly which includes a movable check ring for regulating the flow of heated material past a front seat and into the distribution chamber. The check ring moves rearwardly into sealing engagement with a rear seat portion of the check valve assembly in response to back pressure created by the plastic trapped in a filled distribution chamber during the injection molding cycle. When the back pressure is released upon filling of the mold cavity, the check ring moves away from the rear valve seat allowing for the continued flow of the melted plastic material through the check valve assembly and into the distribution chamber for subsequent discharge through the nozzle and into the mold cavity during the next injection cycle. The heated material is in the form of a cylindrical sleeve as it moves through an annular flow gap formed by the internal periphery of the check ring.

A common problem with such types of check valve assemblies having the movable check ring is that the cylindrical sleeve of material flowing pass the check valve is restricted when flowing pass the front valve seat due to the size and configuration of the opening provided in the front seat.

These prior front seat openings usually consist of a plurality of ports or arcuate groove sections arranged in a segmented circular fashion at the end of the annular flow gap whereby the sleeve of material continues to move axially through the plural openings for subsequent splitting and distribution through flutes or other openings prior to entering the distribution chamber. Since the total volume of the front valve seat openings is not equal to the cross sectional volume of the incoming sleeve of material, portions of the moving sleeve of material are blocked requiring the material to be channeled about such obstructions in order to enter the flute areas. This restricted flow reduces the amount of material able to flow into the mold cavity within a predetermined period of time which increases the injection cycle time which determines the capacity and operational speed of the injection molding machine. Also a mechanical shearing action is exerted on portions of the moving sleeve of material as it passes the obstructions and creates frictional heat at the area of the front valve seat which increases the temperature of the moving material. Such heat effects the control temperature of the plastic material which can be critical for certain heat sensitive materials being injection molded.

Examples of prior art injection molding machines having valve assemblies somewhat similar in structure and operation on which the subject invention is an improvement thereon are shown in U.S. Pat. Nos. 2,940,123; 3,319,299; 3,335,461; 3,590,439; 4,062,479; 4,105,147; 4,349,044; and 4,394,117. Accordingly, the need has existed for an improved check valve assembly which provides for the unrestricted flow of a cylindrical sleeve of material past the front valve seat and into the distribution chamber of an injection molding machine. There is no known check valve assembly of which I am aware having an improved front valve seat therein which enables such results to be achieved other than my invention described in detail below.

DISCLOSURE OF THE INVENTION

Objections of the invention include providing an improved check valve assembly for injection molding machines, having an improved front valve seat which does not restrict the flow of a cylindrical-shaped sleeve of material as it moves through the front seat and into a distribution chamber for subsequent discharge through the nozzle opening and into a mold cavity. A still further objective is to provide such an improved check valve assembly in which the front valve seat component thereof is provided with an annular groove in axial alignment with an annular flow path through which a sleeve of material moves before being discharged into the mold cavity, in which the groove has a radial width and average depth equal to or greater than the radial thickness of the moving sleeve of material, and in which the groove communicates with enlarged flutes which connect the groove to a material discharge chamber whereby the sleeve of material entering the groove passes into the enlarged areas of the flutes without any restrictions or blockage of portions of the material as heretofore occurred in prior check valve assemblies using a similar front valve seat configuration.

Still another objective of the invention is to provide such an improved check valve assembly which includes a check ring which is moved forwardly and rearwardly by the pressures of the plastic material to selectively block the flow of incoming plastic material being moved along a heated barrel by a feedscrew during an injection cycle. Another objective is to provide such an improved valve assembly in which the front and rear seats are replaceable components and are slidably mounted on the shank of a retainer with the check ring being slidably captured therebetween, enabling the individual component parts to be replaced if they become worn without requiring replacement of the entire assembly, in which the improved front seat components of existing valve assemblies can be modified to provide the unrestricted flow advantage without affecting the normal operational sequence of the machine except for increasing the speed of the injection cycle, and in which less frictional heat is created at the front seat location due to reduction of the mechanical shear heretofore exerted on the axial moving sleeve of material due to the elimination of the restrictions. A further objective is to provide such an improved valve assembly in which the bottom surface of the annular front valve seat groove may be concave or may have outwardly projecting peaks to assist in channeling the incoming sleeve of material into the adjacent enlarged flute areas and in which the flute areas, are formed by a plurality of circumferentially spaced projections which extend axial along a central sleeve of the front valve seat which sleeve slidably mounts the seat, about the shank of the retainer and on the axially extending hub of the rear valve seat.

These objections and advantages are obtained by the improved check valve assembly of the invention, the general nature of which may be stated as including a valve assembly for an injection molding machine of the type having a heated cylindrical barrel containing a rotating and reciprocating feedscrew therein for feeding heated thermoplastic material therethrough past the valve assembly toward a discharge chamber at the forward end of the barrel, wherein the valve assembly includes front and rear valve seats, and a check ring sliadably guided by its outer periphery on the interior surface of the barrel cylinder and forming an annular-shaped flow gap along its inner periphery for feeding a cylindrical-shaped sleeve of material therethrough; the improvement including an annular-shaped groove formed in a front face of the front valve seat in axial alignment with the annular-shaped flow gap and having an average depth at least equal to the thickness of the sleeve of material moving through said flow gap; and a plurality of flutes formed in the front seat and communicating with the groove to enable the sleeve of material to flow unrestricted through the front seat of the valve assembly and into the discharge chamber by passing from the flow gap and into the flute through the annular-shaped groove.

BRIEF DESCRIPTION OF THE DRAWINGS

A preferred embodiment of the invention, illustrative of the best mode in which applicant has contemplated applying the principles, is set forth in the following description and is shown in the drawings and is distinctly and particularly pointed out and set forth in the appended claims.

FIG. 1 is a perspective view of a prior art replaceable front seat component of a check valve assembly;

FIG. 2 is a perspective view similar to FIG. 1 showing the improved front seat component of the improved check valve assembly;

FIG. 3 is a side elevational view with portions broken away and in section of the improved check valve assembly with the check ring shown in a forward position allowing an unrestricted path for the heated material to flow toward a mold cavity;

FIG. 4 is a view similar to FIG. 3 with the check ring being shown in a rearward position in contact with the rear valve seat creating a positive shutoff for the incoming heated plastic material;

Similar numerals refer to similar parts throughout the drawings.

BEST MODE FOR CARRYING OUT THE INVENTION

Figure 5:
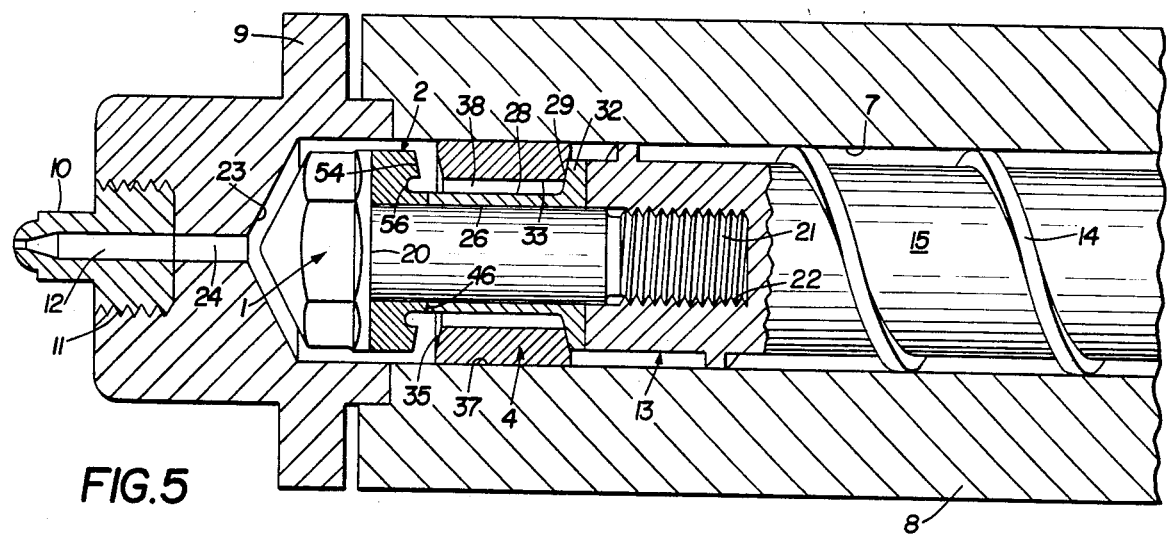
FIG. 5 is a view of the improved valve assembly mounted within the barrel of an injection molding machine with the check ring being shown in the retracted position of FIG. 4.

The improved check valve assembly is indicated generally at 1 and is shown particularly in FIGS. 3 and 4 with the improved component thereof, namely the front valve seat, which is indicated generally at 2 being shown in FIG. 2. Valve assembly 1 is shown in the drawings and described throughout as being a four-piece valve assembly consisting of front valve seat, a rear valve seat, a check ring and a retainer indicated generally at 2. 3. 4 and 5, respectively. However, the invention need not be limited to a valve assembly having the four individual separate replaceable components as described below and shown in the drawings but can be incorporated into a valve assembly in which certain of the parts are formed as single unitary members or could include additional components.

Figure 6:
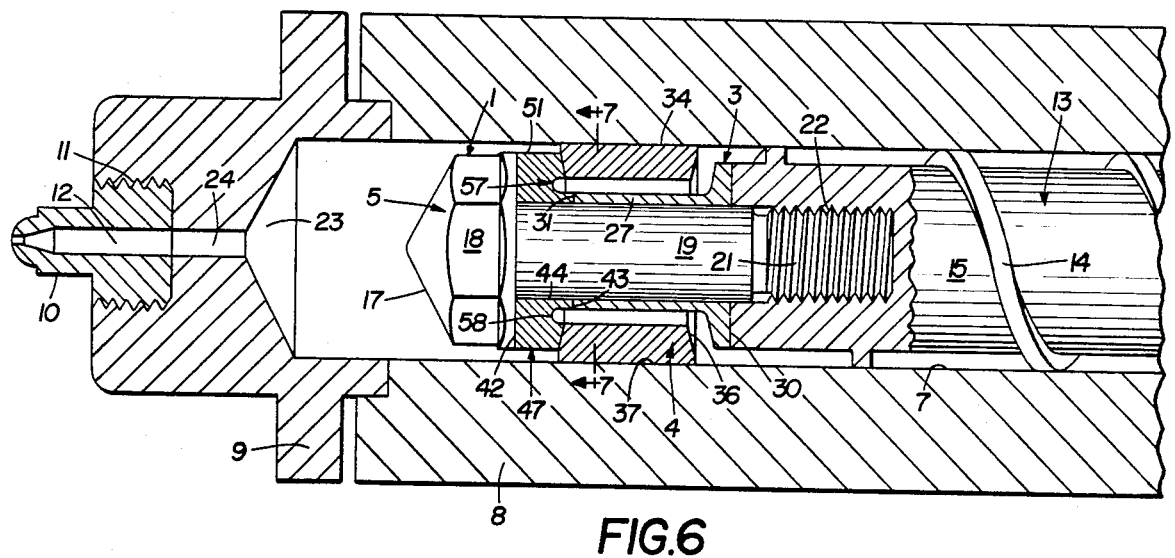
FIG. 6 is a sectional view similar to FIG. 5 with the check ring being shown in the forward open position of FIG. 3.
Figure 7:
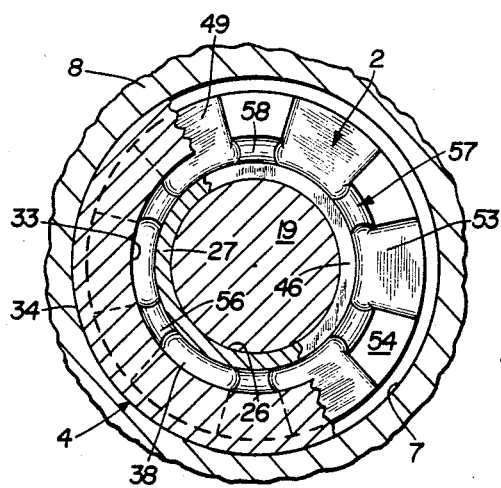
FIG. 7 is an enlarged fragmentary sectional view with portions broken away, taken on line 7—7, FIG. 6.

Check valve assembly 1 is shown in FIGS. 5 and 6 mounted within a cylindrical bore 7 of a barrel 8 of a usual injection molding machine which has a end cap 9 mounted on the forward end of barrel 8 on which a nozzle 10 is secured by a threaded connection 11. Nozzle 10 is formed with an orifice 12 through which the heated plastic material flows for injection into a usual mold cavity (not shown).

Valve assembly 1 is mounted on the forward end of a usual feedscrew which is indicated generally at 13, which has a helical screw thread 14 separated by valleys 15. Feedscrew 13 is mounted within barrel bore 7 for reciprocating axial movement in addition to rotational movement which is common in many types of injection molding machines and forms no particular part of the present invention.

Retainer 5 is a one piece member which includes a tapered front end 17 (FIGS. 3 and 4) which terminates in a plurality of flats 18 adapted for engagement by a wrench for mounting the retainer and remaining valve components on the front end of feedscrew 13. Retainer 5 further includes a cylindrical shank 19 which has a reduced diameter with respect to the front portion of the retainer and forms an annular radially extending shoulder 20 at the junction between shank 19 and the area containing flats 18. The extended end of shank 19 terminates in a threaded portion 21 which is threadably engaged within a threaded opening 22 formed in the outer end of feedscrew 13 (FIG. 6). The particular configuration of tapered retainer end 17 will vary according to the particular configuration of a material distribution chamber 23 formed within end cap 9 in which front end 17 is located at the foreward end of its injection stroke as shown in FIG. 5. The heated material within chamber 23 is fed through an axially extending opening 24 formed in end cap 9 and nozzle 10 for subsequent ejection through nozzle orifice 12.

Rear valve seat 3 includes a cylindrical hub 27 having an internal bore 26 complementary to the diameter of retainer shank 19 so as to provide a sliding engagement therewith. The outer surface 28 of hub 27 has a smooth cylindrical configuration. Hub 27 terminates at one end in an radially outwardly extending collar 32 which has a conical sealing face 29 and a flat annular end face 30. The forward end of hub 27 terminates in an annular edge 31.

Figure 8:
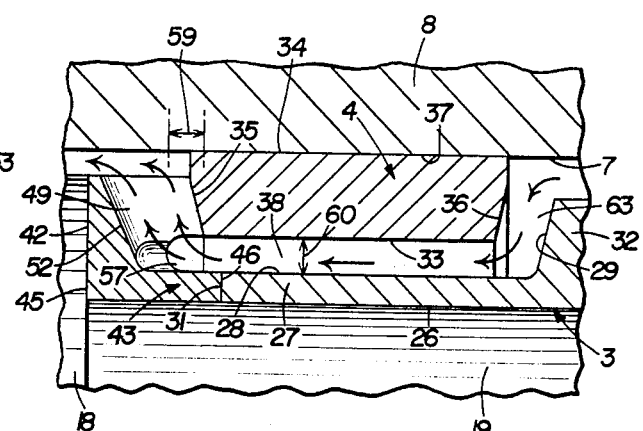
FIG. 8 is an enlarged fragmentary view with portions in section showing the flow path of the heated plastic material through a portion of the improved front seat component of FIG. 2.

Check ring 4 has an annular configuration and includes a cylindrical bore 33 and an outer cylindrical surface 34 with the two ends having inwardly tapered conical sealing surfaces 35 or 36. Outer cylindrical surface 34 of check ring 4 is sliadably guided by inner surface 37 of barrel 8 which forms cylindrical bore 7 as shown in FIGS. 5 and 6. As shown in FIG. 8, outer cylindrical surface 28 of rear seat 3 together with the interior surface of check ring bore 33 forms an annular flow gap 38 which provides for the flow of a cylindrical-shaped sleeve of heated plastic material therethrough.

Improved front valve seat 2 which provides the desired advantages achieved by check valve assembly 1 is shown particularly in FIG. 2. The prior art front valve seat of which seat 2 is an improvement thereon is indicated generally at 40 and is shown in FIG. 1 to provide a comparison therebetween. Front valve seat 2 has a generally annular configuration with a flat annular rear surface 42, a central cylindrical-shaped axially extending sleeve indicated generally at 43, the cylindrical interior surface 44 of which forms an opening 45. Sleeve 43 terminates in an outer annular edge 46.

A plurality of projections indicated generally at 47, are spaced circumferentially about sleeve 43 and extend along the outer cylindrical surface 48 of the sleeve and form a plurality of circumferentially spaced openings or spaces 49 referred to as flutes. The outer surfaces 51 of projections 47 have a smooth curved configuration and collectively define a segmented cylindrical surface or wall concentric with sleeve 43. The surface areas surrounding the base of sleeve 43 formed by flutes 49 are tapered outwardly downwardly from sleeve 43 and are indicated at 52 and collectively form a conical base 53 which surrounds sleeve 43 with projections 47 extending axially therefrom parallel with sleeve 43. The outer end surface 54 of each projection 47 is tapered in an outwardly downwardly direction and collectively form a segmented conical end surface or face which abuts with the tapered conical face 35 of check ring 4 when the check ring is in its forward open position as shown in FIGS. 3 and 6.

In accordance with the main feature of the invention front valve seat 2 has a plurality of arcuate shaped groove sections 56 formed in the outer tapered surfaces 54 of each projection 47 adjacent sleeve 43 and collectively form an annular groove indicated generally at 57, between outer surface 48 of sleeve 43 and projections 47. The bottom surface 58 of groove sections 56 preferably have a rounded generally concave configuration. The depth of each arcuate groove section 56 and collectively groove 57 is indicated by arrow 59, FIG. 8, is equal to or larger than the radial thickness of flow gap 38 indicated by arrow 60. This same dimensional relationship is true with respect to the radial opening distance of arcuate groove sections 46 indicated by arrow 61 in FIG. 2. Comparing improved front valve seat 2 of FIG. 2 with prior art valve seat 40 of FIG. 1, it can be seen that valve seat 40, projection surfaces 65 are joined integrally with sleeve 62 and do not provide any flow relief groove sections 56 and thereby form a restriction or partial blockage to the flow of material into flutes.

Check valve assembly 1 is assembled easily by slidably mounting front and rear valve seats 2 and 3 on shank 19 of retainer 5 with check ring 4 being captured therebetween. When valve assembly 1 is mounted on the end of feedscrew 13, the front and rear valve seats are clamped tightly against annular shoulder 20 of retainer 5 by engagement of flat end surface 30 of rear seat 3 engaging an annular shoulder 55 formed on the outer end of feedscrew 13.

The advantages achieved by the improved valve assembly and in particular front valve seat 2 thereof, is understood by the following discussion of the operation of improved valve assembly 1 in a usual injection molding cycle. Plastic material flowing from a hopper (not shown) and through barrel bore 7 upon rotation and axial advancement of feedscrew 13 will enter the valve assembly through an annular opening 63 (FIG. 8) formed between collar 32 of rear seat 3 and rear sealing surface 36 of check ring 4 when the check ring is in the open position of FIGS. 3 and 6 and into annular flow gap 38. The pressure of the incoming plastic will push check valve 4 forward from the closed position of FIG. 5 permitting the plastic to flow through space 63 and into gap 38.

The material flowing through gap 38 will have the configuration of a cylindrical sleeve and will flow through annular groove 57 formed in front valve seat 2, and into enlarged flute areas 49 and them into distribution chamber 23. When retainer 5 is moved forwardly from the position of FIG. 6 to that of FIG. 5 the pressure of the plastic in filled opening 24 and filled distribution chamber 23 will push movable check ring 4 backwardly to the position shown in FIGS. 4 and 5. In this position conical sealing surface 36 of check ring 4 will sealingly engage conical surface 29 of rear valve seat collar 30 shutting off the flow of plastic which will trap the plastic within chamber 23 and force it out of opening 24 and nozzle orifice 12 and into a mold cavity. As feedscrew 13 is moved rearwardly away from nozzle 10, the plastic from the hopper will be moving forwardly through the barrel bore 7 by the rotation of screw threads 14. This forwardly moving plastic will again force check ring 4 forwardly away from rear valve seat 3 against front valve seat 2, in which position the conical surface 35 of check ring 4 will abuttingly engage conical surfaces 54 of projections 47.

In accordance with the main feature and advantage of the invention, which is best illustrated in FIG. 8, the cylindrical sleeve of plastic material moving through and formed by annular flow gap 38 will flow unrestricted into annular groove 57 of front valve seat 2 and will continue forwardly until contacting the concave bottom surface 58 of groove 57. The material then is channeled outwardly into enlarged areas provided by flutes 49 after which it will flow into distribution chamber 23.

Thus, the sleeve of material flows completely unrestricted through the front valve seat due to annular groove 57 whereas in prior art check ring 40 (FIG. 1) a significant portion of the cylindrical sleeve of material will be blocked by the outer surfaces 65 of ungrooved projections 66 which are connected directly to the outer annular edge 67 of front valve seat sleeve 68. Improved front valve seat 2 of valve assembly 1 enables the entire volume of the sleeve of material to flow past the front valve seat and into the end cap cavity or distribution chamber 23 without any restriction as occurs in the prior type of front valve seat as shown in FIG. 1. Once the sleeve of material passes through annular groove 57, the enlarged areas provided by flutes 49 provide no restriction to the moving sleeve of material.

This unrestricted flow of material through the front valve seat increases the flow rate of the moving material with less pressure than heretofore required thereby increasing the recovery time of feedscrew 13 which will increase the injection cycle of the molding machine. Thus, more pounds of plastic material can be injected into the mold cavity within a predetermined period of time than heretofore possible with prior art front valve seat 40. Furthermore, this unrestricted flow of the material sleeve past the front seat will create less frictional heat in the moving material than with prior front valve seat 40. This enables the temperature of the moving plastic material to be more accurately controlled which is critical in certain types of heat sensitive plastic material. These prior obstructions cause mechanical sheer to be exerted on the moving sleeve of material which creates the frictional heat.

It is important that the depth of annular groove 57 and the radially open distance 61 thereof, is equal to or greater than the thickness of the sleeve of material which is determined by the radial distance of annular flow gap 38 indicated by numeral 60 (FIG. 8) to insure that there is no restriction to the axial movement of the sleeve of material. As shown in the drawings, annular groove 57 is in axial alignment with the annular flow gap 38 permitting the smooth continuous flow of material from flow gap 38 into groove 57.

Bottom surfaces 58 of arcuate groove sections 56 which form annular groove 57 need not be concave as shown in the drawings but may have an outwardly extending somewhat triangular shaped projection in order to channel and divide the incoming material more evenly and directly into the adjacent flutes instead of the material first contacting concave bottom surface 58. In such a construction, the average depth of the annular groove is equal to or greater than the thickness of the incoming sleeve of material to provide the desired unrestricted flow characteristic.

Accordingly, the improved check valve assembly, and in particular the improved front valve seat component thereof, enables a sleeve of material to pass unrestricted therethrough, which sleeve of material is formed by the annular-shaped flow gap formed by the interior surface of the check ring; and in which this unrestricted flow increases the flow rate and capacity of the injection molding machine with less frictional heat being absorbed by the material to enable better control of the melt temperature to be obtained than heretofore possible with the known front valve seat constructions.

Accordingly, the improved check valve assembly is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved check valve assembly for injection molding equipment is constructed and used, the characteristics of the assembly, and the advantageous, new and useful results obtained; the new and useful structures, devices, elements, arrangements, parts, and combinations, are set forth in the appended claims.

What is claimed is:

1. An improved check valve assembly for an injection molding machine, said mold machine having a heated cylindrical barrel containing a rotating and reciprocating feedscrew therein for feeding heated thermoplastic material therethrough past the check valve assembly toward a discharge chamber at a forward end of the heated cylindrical barrel, wherein the check valve assembly includes front and rear valve seats, and a check ring slidably guided by an outer periphery thereof on the interior surface of the barrel cylinder and forming an annular-shaped flow gap along an inner periphery thereof for feeding a cylindrical-shaped sleeve of material therethrough; the improvement including a continuous unrestricted annular-shaped groove formed in a front face of the front valve seat in axial alignment with the annular-shaped flow gap and having an average depth at least equal to the thickness of the sleeve of material moving through said flow gap to eliminate blockage of the sleeve of material moving through the front valve seat; and a plurality of flutes formed in the front seat and communicating with the annular-shaped groove to enable the sleeve of material to flow unrestricted through the front seat of the valve assembly and into the discharge chamber by passing from the flow gap and into the flutes through the annular-shaped groove without blockage.

2. The improved check valve assembly defined in claim 1 in which the rear valve seat has a hollow cylindrical-shaped hub terminating at one end in a collar which forms a sealing engagement with a rear sealing face on the check ring; in which said hub is telescopically mounted on a shank of a retainer that is connected to the forward end of the feedscrew; and in which the annular-shaped flow gap is formed between the interior of the check ring and said hub.

3. The improved check valve assembly defined in claim 2 in which the collar has a conical surface which is complementary to the rear sealing face of the check ring.

4. The improved check valve assembly defined in claim 2 in which the retainer has a tapered front nose and a radially extending rear shoulder at the junction with the shank; and in which the front valve seat has a ring-like configuration with an annular end face which abuts against the retainer shoulder.

5. The improved check valve assembly defined in claim 1 in which the front valve seat has a hollow cylindrical configuration with a side wall terminating in generally annular-shaped front and rear end faces; and in which the plurality of flutes are formed in the side wall and extend into the front end face for communication with the annular-shaped groove.

6. The improved check valve assembly defined in claim 1 in which the front valve seat has an annular configuration; in which the flutes are formed by a plurality of circumferentially spaced projections and an annular-shaped sleeve which projects from a conical-shaped base; and in which the annular-shaped groove is formed concentrially about said sleeve and is formed in an outer surface of each of the projections.

7. The improved check valve assembly defined in claim 6 in which the portions of the groove formed in the flute forming projections have a concave bottom surface.

8. The improved check valve assembly defined in claim 6 in which the outer surfaces of the flute forming projections are tapered outwardly and downwardly from an outer annular edge of the sleeve.

9. The improved check valve assembly defined in claim 8 in which the tapered outer surfaces of the flute forming projections form a segmented conical surface which engages an annular-shaped conical front face of the check ring.

10. The improved check valve assembly defined in claim 6 in which a retainer having a tapered forward end and a shank is connected to the feedscrew by the shank; in which the inside diameter of the sleeve of the front valve seat is complementary to the diameter of the retainer shank to provide a telescopic sliding engagement therebetween.

11. The improved check valve assembly defined in claim 10 in which the rear valve seat has a hollow cylindrical-shaped hub terminating at one end in a sealing collar and at the other end in an annular edge; and in which the annular edge of the rear valve seat is in abutment with an annular outer edge of the front valve seat sleeve.

12. The improved check valve assembly defined in claim 10 in which the shank has a threaded end for connecting the retainer to the feedscrew.

13. The improved check valve assembly defined in claim 6 in which the separation between the annular sleeve and flute forming projections formed by the annular-shaped groove is at least equal to the thickness of the sleeve of material moving through the flow gap.

14. The improved check valve assembly defined in claim 1 in which the assembly is comprised of four individual components, the front and rear valve seats, the check ring and a retainer.

* * * * *